May 20, 1969  V. DOMASHOVETZ  3,444,646
TOYS CONTROLLED BY SOUND OF A PRE-DETERMINED FREQUENCY
Filed Sept. 8, 1966

INVENTOR.
VOLODYMYR DOMASHOVETZ
BY
Robertson, Bryan, Parmelee & Johnson
ATTORNEYS.

INVENTOR.
VOLODYMYR DOMASHOVETZ
BY
ATTORNEYS.

United States Patent Office 3,444,646
Patented May 20, 1969

3,444,646
TOYS CONTROLLED BY SOUND OF A
PRE-DETERMINED FREQUENCY
Volodymyr Domashovetz, Newark, N.J., assignor to
Remco Industries, Inc., Harrison, N.J., a corporation of New Jersey
Filed Sept. 8, 1966, Ser. No. 577,911
Int. Cl. A63h 33/26; H01h 35/24
U.S. Cl. 46—244                              12 Claims

ABSTRACT OF THE DISCLOSURE

Motor-operated toys controlled by sound waves of predetermined frequency are provided. The sound waves enter an opening in a resonant box and, when of the resonant frequency, cause the air in the box to vibrate and to move an electrical contact inside the box and so actuate the toy. Positioning the contact within the box at an anti-node removed from the opening enhances the sensitivity of the unit over prior devices which had the contact across the opening.

---

This invention relates to toys that are motor-operated and which have their action controlled by sound waves. In particular, it relates to toys, the controls of which are highly sensitive to selected sound frequencies.

To the extent that sound actuated toys have been made in the past, their sensitivity to sound has either been small, or, if not small, has been based on relatively expensive microphones and amplification systems for receiving the sound. In addition, they have not been as selective in the sounds to which they respond as they might have been and, accordingly, have sometimes responded to extraneous noises or vibrations.

My invention provides a sound actuated toy which is simple and inexpensive to construct, but which is responsive to a sound wave of a pre-selected frequency. Due to high sensitivity and tunability, a plurality of toys may be used at one time, each of which may be tuned to a different frequency and so independently controlled by sound.

These results are accomplished by incorporating in the toy, a unique sound-actuated resonator box and associated circuitry. The resonator will accept sound waves of only the respondant frequency, or harmonics thereof, and subject to motion by the vibration of the air within the resonator. The switch mechanism itself is preferably not located across the opening of the resonator box, and so, does not dampen the motion of the air entering and leaving the box. Rather, the switch is located within the box, preferably at an anti-node, and thus is affected by vibration of the air within the resonator without itself serving appreciably to dampen that vibration. Selectivity is therefore enhanced, sometimes by a factor of as much as 10:1. In addition, the switch does not directly control the motor, but rather acts through a relay, preferably a slow-acting relay, and so eliminates extraneous noise, such as a clap of the hands, and extraneous vibration, such as pounding on a table on which the toy is located.

The control unit of my invention may be used for both fixed and movable toys and is here shown adapted for use in a toy arrangement made up of a small tugboat mounted on wheels and a drawbridge under which the tugboat may pass. The tugboat and the drawbridge are both actuated by sound, but sound of different frequency so that they may be controlled independently of one another.

Turning to the drawings.

Figure 1:
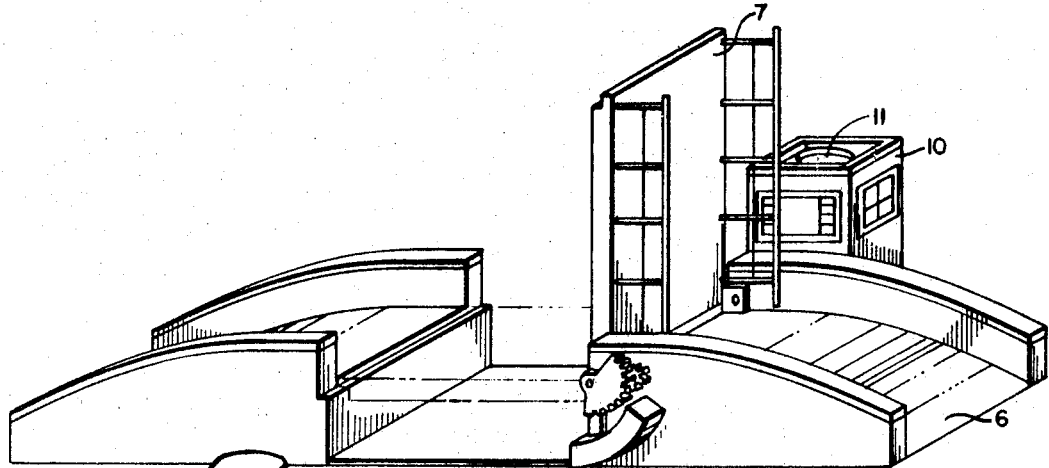
FIG. 1 is a perspective view showing a tugboat and a drawbridge of types that may each be actuated by the device of my invention. They are representative of vehicular and stationary toys.

Referring to the drawings in more detail, FIG. 1 shows a tugboat, adapted to move along the floor on wheels 2, and a drawbridge structure 5. Drawbridge structure 5 consists of roadway portion 6 and drawbridge 7. Each of these units has an opening in a portion of its structure to receive a sound wave. As shown in the particular illustrations, tugboat 1 has an open stack 9 through which sound waves may pass; and drawbridge structure 5 includes a control building 10 having an opening at the top 11 to receive the sound waves. The actual control units in each instance are within the respective structures. They are similar to each other, although preferably, they are attuned to receive different frequencies.

Located within tugboat 1 is a motor 15 and associated gear train 16 connected with one or more of the wheels 2 to move tugboat 1. Motor 15 is preferably reversible and is powered by battery 18 connected to motor 15, as will be described below.

Located within tugboat 1 also is a resonator 20 held by supporting surfaces 21 and 22 within tugboat 4. Positioned between resonator 20 and supporting surfaces 21 and 22 are sound and vibration damping pads 23 and 24. These may be of rubber or other material capable of dampening sounds or vibrations which could be transmitted from the body of tugboat 1 to resonator 20.

One of the output terminals of battery 18 passes through lead 27 to terminal 29 on resonator 20. The other output terminal is connected to lead 28 to a control relay 33. A second control terminal on resonator 20 is connected by lead 34 to relay 33.

Figure 3:
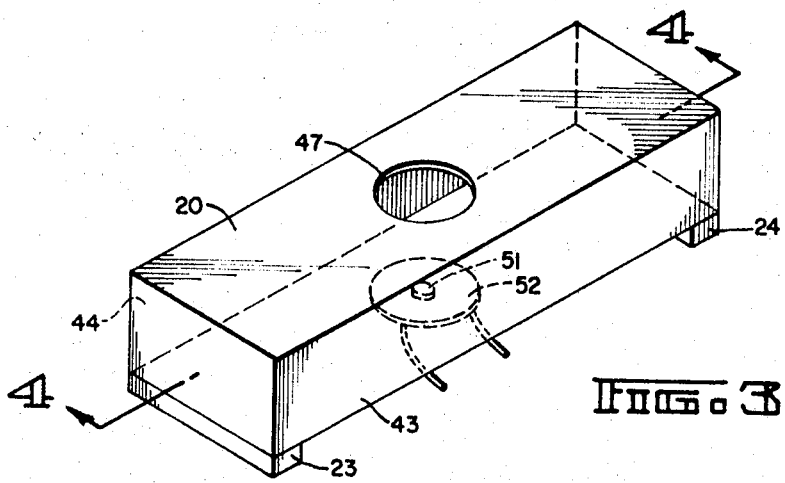
FIG. 3 is a perspective view of the preferred form of resonator box for use in my invention.
Figure 4:
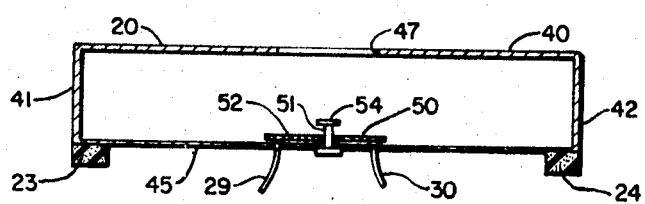
FIG. 4 is a longitudinal section of the resonator box of FIG. 3.

The structure of resonator 20 is most clearly depicted in FIGS. 3 and 4. The resonator is preferably in the shape of a rectangular box having an upper surface 40, end walls 41 and 42, side walls 43 and 44, and a bottom 45. The box, including the top and bottom, have the side walls preferably made of a plastic material such as a styrene. For reasons to be described below, it is often best to have the bottom 45 thinner than the side walls and the top wall.

Located in approximately the center of the top 40 is an opening 47; located in approximately the center of bottom 45 is a normally-closed switch 50.

Switch 50 is made up of terminals 29 and 30, passing through the bottom 45 of resonator 20 to project inside the resonator; contact plate 52, resting on terminals 29 and 30 and interconnecting them; and mounting pin 51, which passes through bottom 45 and through an opening in the center of plate 52. Pin 51 has a head 54 on it inside resonator 20 sufficiently large to hold plate 52 thereon, and sufficiently above the inner surface of bottom 45 to permit plate 52 to vibrate above terminals 29 and 30, breaking the interconnections between the two.

Resonator 20 is sometimes referred to as a Helmholtz resonator in that it has a resonant frequency. Switch 50 is positioned within resonator 20 at an anti-nodal point, so that at resonance the vibration of the air about switch 50 is greatest. Contact plate 52 is preferably lightweight so that when resonator 20 is vibrating at resonance (such as would occur when it receives a sound wave through opening 47 at the resonant frequency) plate 52 will vibrate and break the interconnection between the terminals 29 and 30. Plate 52 may be made of this metal sheet or of plastic with a conductive coating on one surface.

If bottom 45 is of a stiff but thin material, preferably thinner than the remainder of the walls and top of resonator 20 bottom 45 may also vibrate and accentuate the vibration effect on switch 50. By having resonator mounted on pads 23 aid 24, unwanted extrinsic vibrations imparted to the tugboat 1, or other toy being controlled by resonator 20, are less apt to be passed on to switch 50.

Resonator 20 with its associated closed switch 50 and its associated circuitry is located not only in tugboat 3, but, in substantial duplicate, in drawbridge structure 5. Preferably, however, this second resonator unit is tuned for a different sound wave frequency than the resonator found in tugboat 1.

Figure 2:
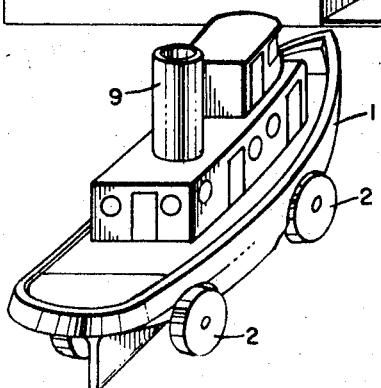
FIG. 2 is a partial section longitudinally of the tugboat of FIG. 1.
Figure 2:
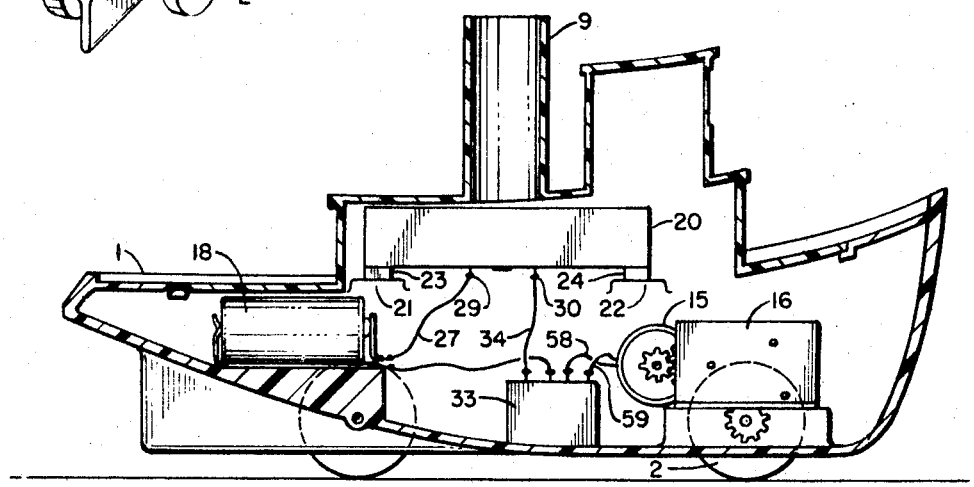

Leading from relay 33, in FIG. 2, are two leads 58 and 59 which go to motor 15. Relay 33 may be a stepping relay which steps every time the input current is broken momentarily and then resumed. It may have on-off positions, or on-forward-off-on-reverse-off positions. In the first instance, each break of the current will either turn the motor either off or on. In the other instance, each break in the current will turn the motor either off or on and each time it turns it on it will run in the opposite direction.

Preferably, relay 33 is of a slow acting type and will not respond to breaks in the flow of input current of less than from 0.1 to 0.5 second. This makes it more selective so that it will not respond to unusual noises that happen to include some sound waves of the frequency to which the resonator is tuned or to vibrations which may otherwise be transmitted to switch 50.

Figure 5:
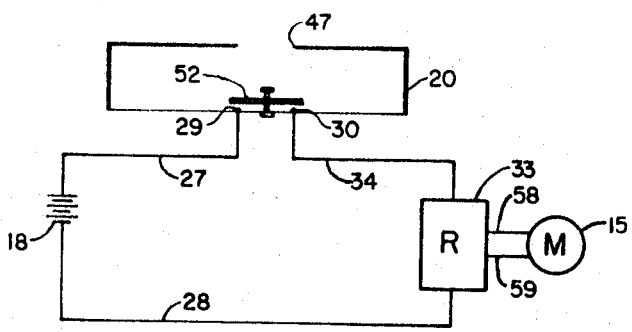
FIG. 5 is a schematic diagram showing one form of circuitry which may be controlled by sound in accordance with my invention.

One form of circuitry that may be used is shown in FIG. 5. One terminal of battery 18 is connected to relay 33 through lead 28. The other terminal is connected to relay 33 through lead 27, normally-closed switch 50, and lead 34. As can be seen, current normally flows through the relay unless the battery 18 is disconnected. To avoid this, one may, if desired, use the lead 34 coming from the switch to control a transistor, as through its base connection, which in turn would control, with a separate source of potential, the relay 33. This, in effect, would convert a normally-on condition to a normally-off condition.

In operating the tugboat 1, or the drawbridge structure 5, battery 18 is connected, thus actuating the relay through switch 50. The child has a whistle, musical instrument, or other means of producing a sound of the frequency to which resonator 20 is attuned. Upon blowing the whistle, the air within resonator 20 vibrates, particularly at its anti-nodal points, causing contactor plate 52 to vibrate and so disconnecting it from one or both of terminals 29 and 30. This serves to break the circuit between battery 18 and relay 33, and if the sound is continued for a sufficiently long time, will step the relay. Upon discontinuance of the sound, the circuit 50 is again closed and relay 33, using the energy from the battery 18 actuates motor 15 into the forward or reverse direction, or will stop actuation of the motor.

The unit in tugboat 1 then will serve to control stop, forward, and reverse motion of the tugboat. The similar unit in drawbridge structure 5 will likewise serve to control up, down, or stop motion of the bridge 7. One may, of course, if desired, so arrange the circuit elements in the bridge structure 5 that motion of the lift bridge 7 is stopped when it reaches the top or the bottom position.

By virtue of the fact that the tugboat and the lift bridge are attuned to different frequencies, the child may, by using two different whistles, control the units separately.

It is also possible, if desired, to put two resonator units, attuned to different sound wave lengths, in one structure such as tugboat 1. These can so be connected to a given relay that one would start the motor, and the other stop it. Or, one would start and stop the motor, and the other control the direction of the motor. Similarly, many other variations of my invention can be made without departing from the spirit thereof.

I claim:

1. A toy, the action of which is controlled by receipt of a sound wave of a predetermined frequency, said toy including a motor, a power supply, and control means for interconnecting said motor and said power supply, a resonator having a switch therein, said switch being connected to said control means to actuate same and to control said motor, said resonator being of a box-like configuration, and having a resonant frequency the same as said predetermined frequency, said resonator having an opening in one wall thereof to receive sound waves, said switch being positioned in another wall thereof removed from said opening, and said switch including terminals and a contacting plate interconnecting said terminals, said contacting plate being free to vibrate in response to vibrations of the air within said resonator whereby said switch will control the action of said toy.

2. The toy of claim 1 in which said normally closed switch is located at an anti-nodal point in said resonator.

3. The toy of claim 1 in which said resonator is mounted on sound damping pads to reduce transmission of external vibrations to said resonator.

4. The toy of claim 1 in which the wall carrying said normally-closed switch is thinner than the other walls of said resonator whereby it may vibrate more readily upon the receipt of sound waves than the other walls of said resonator.

5. The toy of claim 1 in which said control means is slow-acting.

6. In a toy adapted to be actuated by sound waves of a predetermined frequency and having motor means for actuating said toy. A resonator to control said motor, said resonator having a plurality of walls defining a chamber having a resonant frequency the same as said predetermined frequency, an opening in one of the walls of said resonator to receive sound waves from a source outside the toy, and a sound actuated switch on another of said walls removed from said opening and positioned within said chamber, said switch including at least two terminals and a contact plate interconnecting said terminals, said contact plate being mounted so as to be free to vibrate in response to vibration of the air in said chamber and to thereby affect the connection of said terminals with one another, said switch being interconnected with said motor to control the action thereof, whereby the action of said motor may be controlled by the receipt of said sound waves of a predetermined frequency transmitted through the air to said toy.

7. A resonator for controlling the action of a toy as set forth in claim 6 in which said switch is a normally-closed switch and is located at an anti-nodal point in said resonator.

8. A resonator for controlling the action of a toy as set forth in claim 6 in which said resonator is mounted on sound damping pads to reduce transmission of vibration from said toy to said resonator.

9. A resonator for controlling the action of a toy as set forth in claim 6 in which the wall carrying said switch is thinner than the other walls of said resonator whereby it may vibrate more readily upon the receipt of sound waves than the others of said walls.

10. A resonator for controlling the action of a toy as set forth in claim 6 in which said switch is normally-closed.

11. A sound-actuated resonator for controlling the motion of a toy actuated by a motor, said resonator including a hollow box having an opening in one wall thereof, said box having a predetermined resonant frequency, an electrically conductive connector plate located within said box at a position removed from said opening, said plate being mounted with freedom to move in response to vibration of air within said box, terminals associated with said plate positioned so as to be interconnected by said plate, said interconnection being affected by the motion of said plate during said vibration of air, and means associated with said plate and said terminals for interconnecting same with said motor for controlling the action of said toy in response to sound waves of said predetermined frequency received by said resonator.

12. A resonator as set forth in claim 11 in which said plate is located at an anti-nodal point therein.

References Cited

UNITED STATES PATENTS

| 2,957,957 | 10/1960 | Johnson | 46—243 |
| 2,995,866 | 8/1961 | Johnson | 46—244 |

FOREIGN PATENTS 1,098,870  2/1961  Germany.

LOUIS G. MANCENE, *Primary Examiner.*

ROBERT F. CUTTING, *Assistant Examiner.*

U.S. Cl. X.R.

200—61.01